United States Patent [19]

Yamanari et al.

[11] Patent Number: 4,808,369
[45] Date of Patent: Feb. 28, 1989

[54] EMERGENCY CORE COOLING APPARATUS

[75] Inventors: Shozo Yamanari; Tetsuo Horiuchi; Kenji Tominaga; Hiroshi Goto; Satoshi Miura, all of Hitachi, Japan

[73] Assignees: Hitachi, Ltd., Tokyo; Hitachi Engineering Co., Ltd., Ibaraki, both of Japan

[21] Appl. No.: 188,704

[22] Filed: May 4, 1988

Related U.S. Application Data

[63] Continuation of Ser. No. 26,842, Mar. 17, 1987.

[30] Foreign Application Priority Data

Mar. 19, 1986 [JP] Japan .................................. 61-59169

[51] Int. Cl.4 .............................................. G21C 15/18
[52] U.S. Cl. .................... 376/282; 376/283; 376/299
[58] Field of Search ................ 376/282, 283, 298, 299

[56] References Cited

PUBLICATIONS

Strauss, Power, Nuclear Power Plant Safety, Jan. 1968, pp. 160–165.
Hilton et al., Nuclear Engineering International, Principal Safety Features, Nov. 1973, pp. 880–882.
Glasstone et al., Nuclear Reactor Engineering, 1981, pp. 692 and 693.

Primary Examiner—Charles T. Jordan
Assistant Examiner—Richard W. Wendtland
Attorney, Agent, or Firm—Antonelli, Terry & Wands

[57] ABSTRACT

Two systems of low-pressure core spray appratuses have coolers, and are adapted to supply cooling water to a core spray header provided in a core-surrounding cylindrical shroud in a reactor pressure vessel. Two systems of high-pressure core flooding apparatuses and one system of high-pressure coolant injection apparatus are adapted to supply the cooling water to a region formed between the shroud and reactor pressure vessel. The elevation of the openings, which are in the reactor pressure vessel, of the high-pressure core flooding apparatuses and high-pressure coolant injection apparatus are higher than that of the core spray header. A pipe for returning the cooling water in the reactor pressure vessel to the above-mentioned coolers is connected to either the portion of the interior of the reactor pressure vesssel which is below the core or the portion of the interior of the reactor pressure vessel which is between the walls of the shroud and reactor pressure vessel. The above-mentioned pipe is provided therein with a valve which is adapted to be closed when the nuclear reactor stops being operated in an emergency in which the breakage of a pipe occurs, and to be opened when the nuclear reactor is stopped under normal conditions.

20 Claims, 6 Drawing Sheets

EMERGENCY CORE COOLING APPARATUS

BACKGROUND OF THE INVENTION

This application is a continuation of application Ser. No. 026,842, filed Mar. 17, 1987.

This invention relates to an emergency core cooling apparatus, and more particularly to an emergency core cooling apparatus having high-pressure systems and low-pressure systems.

A boiling water nuclear power plant is provided with an emergency core cooling apparatus for dealing with a loss of coolant accident.

An example of a conventional emergency core cooling apparatus for a boiling water reactor is discussed under "Current Status of Advanced Boiling Water Reactor (ABWR)" in the "Hitachi Review" (December 1984 issue, Vol. 33 - No. 6), pages 299-306.

As will be described in detail later, this conventional emergency core cooling apparatus has two systems of high-pressure core spray apparatus (which will hereinafter be referred to as HPCS), one system of high-pressure coolant injection apparatus (which will hereinafter be referred to as HPCI) and three systems of low-pressure flooding apparatus (which will hereinafter be referred to as LPFL). The HPCS's and HPCI are high-pressure emergency core cooling apparatuses, and the LPFL's low-pressure emergency core cooling apparatuses.

SUMMARY OF THE INVENTION

An object of the present invention is to provide an emergency core cooling apparatus capable of preventing the effective heat generating portion of a core from being exposed no matter what kind of breakage occurs in a pipe for an emergency core cooling apparatus.

Another object of the present invention is to provide an emergency core cooling apparatus capable of cooling a core when the nuclear reactor is stopped under normal conditions, by using compact coolers.

The first characteristics of the present invention reside in that the elevation of the coolant discharge ports, which are in a reactor vessel, of a plurality of high-pressure emergency core cooling systems, which are adapted to supply a coolant to the interior of a core-surrounding shroud in the reactor vessel, is set higher than that of the coolant discharge ports, which are in the shroud, of a plurality of low-pressure emergency core cooling systems, which are adapted to supply a coolant to the interior of the reactor vessel.

Since the positions of the coolant discharge ports, which are in the reactor vessel, of the high-pressure emergency core cooling systems are set higher than those of the coolant discharge ports, which are in the shroud, of the coolant discharge pipes for the lower-pressure emergency core cooling systems, a core cooling operation can be carried out effectively by the high-pressure emergency core cooling systems from a point in time earlier than the time of depressurization of the nuclear reactor in the case where the breakage of a pipe (breakage of a pipe in a low-pressure emergency core cooling system) occurs in a low position, at which the securing of a predetermined water level in the nuclear reactor must be done under severe conditions at the time of occurrence of the breakage of a pipe, in the nuclear reactor. When the breakage of a pipe (breakage of a pipe in a high-pressure emergency core cooling system) occurs in a high position, a large quantity of water resides in the nuclear reactor, and, moreover, the water level in the nuclear reactor rapidly reaches the elevation of the coolant discharge ports of the high-pressure emergency core cooling systems, so that the depressurization rate in the nuclear reactor due to the steam discharge becomes high. Consequently, the occurrence of an increase in the coolant injection rate of the remaining high-pressure core cooling systems and the early starting of the injection of a coolant by the low-pressure core cooling systems can be expected. As a result, a decrease in the water level in the nuclear reactor is suppressed.

The second characteristics of the present invention reside in that the requirements, which are other than the requirements constituting the first characteristics mentioned above, are added thereto, the additional requirements consisting of providing the coolant discharge ports, which are in the shroud in the low-pressure emergency core cooling systems, at the portions of the interior of the shroud which are above the core, and providing the cooling means in the low-pressure emergency core cooling systems with a means for supplying the coolant, which is in the portion of the interior of the reactor pressure vessel which is below the core or between the shroud and reactor vessel, to the core when the nuclear reactor is stopped under normal conditions.

According to such second characteristics, the low-pressure emergency core cooling systems are furnished with the functions of supplying a coolant to the core, and the coolant in the reactor vessel is supplied from the portion of the interior of the reactor vessel which is on the outer side of the shroud or the lower portion of the interior thereof to the cooling means in the low-pressure emergency core cooling systems. Accordingly, when the nuclear reactor is stopped under normal conditions, the coolant cooled by the cooling means passes through the core necessarily, so that the core can be cooled reliably. Since the high-temperature coolant, which has passed through the core, is necessarily supplied to the cooling means in the low-pressure emergency core cooling systems, the operation efficiency of these cooling means can be improved, and the capacity of these cooling means can be reduced.

DETAILED DESCRIPTION OF THE PREFERRED EMBODIMENTS

The present invention has been developed on the basis of the results of the discussion of the characteristics of the conventional emergency core cooling apparatus shown in the "Hitachi Review" referred to in the previous paragraph. The contents of this discussion are as follows.

Figure 1:
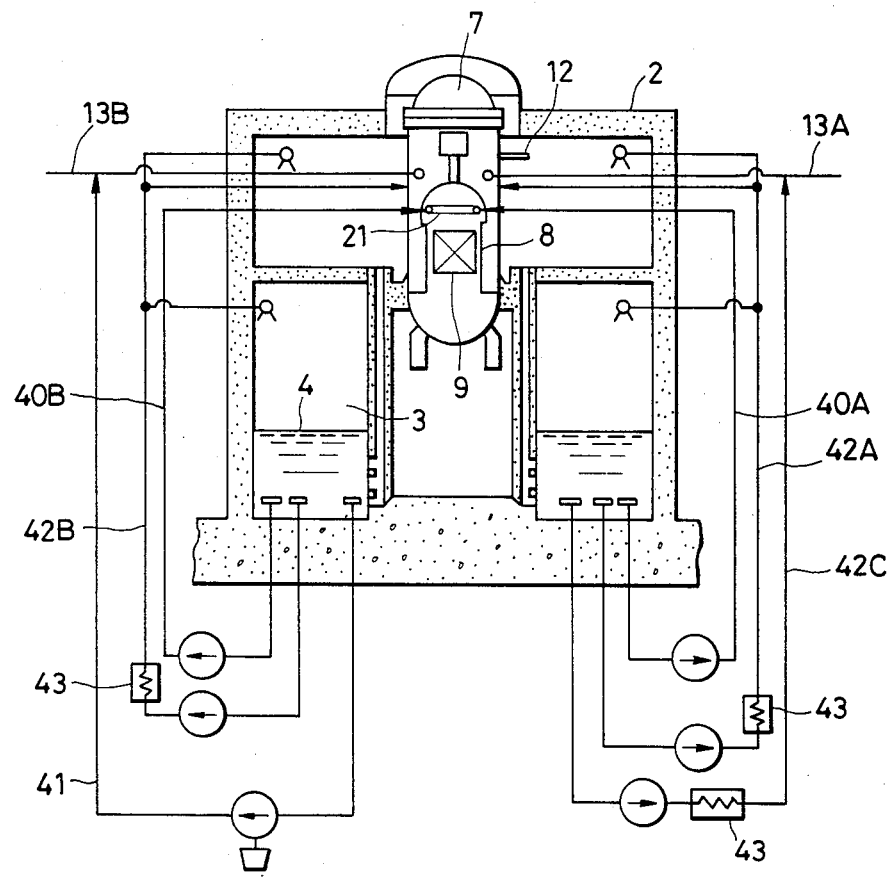
FIG. 1 is a system diagram of a conventional emergency core cooling apparatus.

FIG. 1 is a schematic system diagram of the emergency core cooling apparatus taken from the "Hitachi Review", page 300.

The conventional emergency core cooling apparatus has two systems of HPCS 40A, 40B, one system of HPCI 41, and three systems of LPFL 42A, 42B, 42C. Each of HPCS and LPFL has a motor-driven pump. The HPCI has a turbine-driven pump. Each of LPFL has a heat exchanger (cooler) 43 functioning as a residual heat removal apparatus (RHR apparatus).

A core spray header 21 is provided at the upper portion of the interior of a core shroud 8 disposed in a reactor pressure vessel 7 and surrounding a core 9. This core spray header 21 is connected to HPCS's 40A, 40B. When HPCS's 40A, 40B are driven, the cooling water 4 in a suppression chamber 3 is sprayed to the core 9 by the core spray header 21. When LPFL's 42A, 42B are driven, the cooling water 4 is injected into the portion of the interior of the reactor pressure vessel 7 which is on the out side of a core shroud 8. When LPFL 42C and HPCI 41 are driven, the cooling water 4 is supplied to the interior of the reactor pressure vessel 7 via feed water pipes 13A, 13B.

The conventional emergency core cooling apparatus has three diesel-engine generators as emergency power sources used when a normally-driven power source fails. The pump in each of HPCS's and LPFL's is driven by these diesel-engine generators. The conventional emergency core cooling structure is divided into three sections, i.e. section I having HPCS 40A and LPFL 42A, section II having HPCS 40B and LPFL 42B and section III having HPCI 41 and LPFL 42C. One diesel-engine generator is alloted to each section.

Since an emergency core cooling apparatus requires to have a high reliability, it is necessary that the highest effect to be produced with a required minimum capacity thereof. Especially, the economical efficiency and the improvement of performance of the structure have earnestly been studied.

The present inventors discussed the properties of the conventional emergency core cooling apparatus to discover that, if the breakage of a HPCS pipe (a pipe for a HPCS) should have occurred, there was the possibility that the water level in the nuclear reactor become slightly lower than the top of effective heat generating portion.

The contents of the above discussion are as follows.

Figure 5:
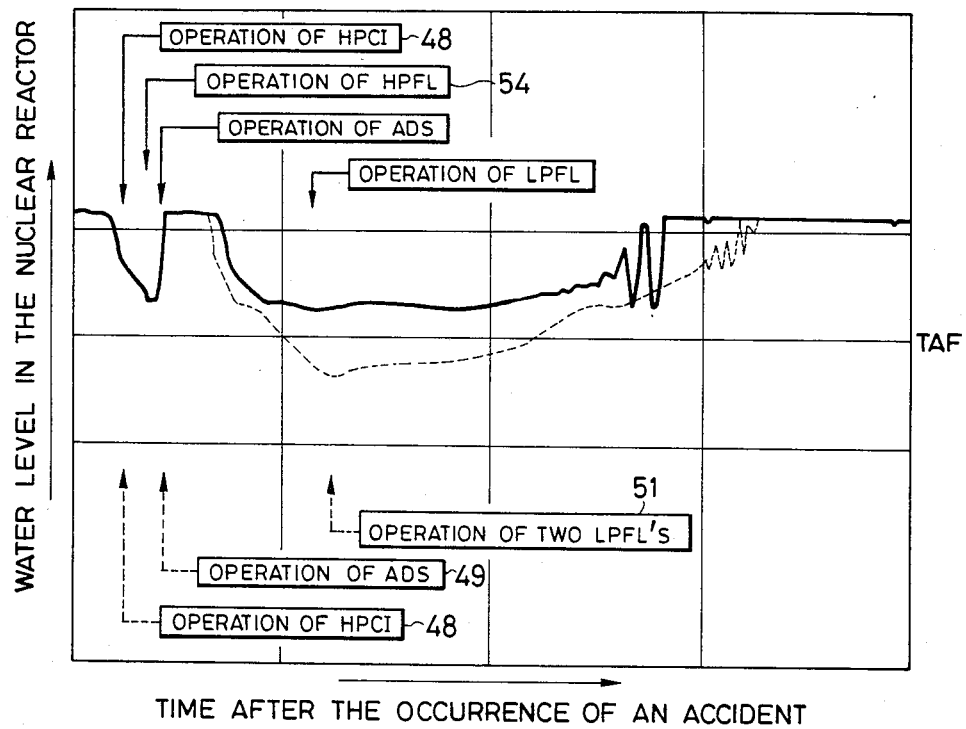
FIG. 5 is a characteristic diagram showing transients of the water level in the nuclear reactor at the time of occurrence of the breakage of a pipe in an emergency core spray system.

The transients, which would occur if the breakage of a HPCS pipe takes place in the conventional emergency core cooling structure, in the water level in the nuclear reactor are shown by a broken line in FIG. 5.

When a HPCS pipe is broken, the nuclear reactor is automatically scrammed and isolated but the cooling water in the reactor pressure vessel 7 blow down from a brak pipe, so that the water level in the nuclear reactor begins to decrease. When the water level in the nuclear reactor begins to decrease, the high-pressure emergency core cooling systems are operated automatically (HPCI 48 operates) in advance of any other means. When a pipe for HPCS 40A in the section I is broken under the diesel-engine generator in the section II failing, HPCI 41 is left as an operable high-pressure emergency core cooling system. Accordingly, only one high-pressure emergency core cooling system is operated (HPCI 48 operates), and an automatic depressurization system (ADS) is then operated (ADS 49 operates). As a result, the cooling water level in the reactor pressure vessel 7 is recovery to temporarily because of flushing by depressurization. However, the water level in the nuclear reactor vessel thereafter decreases again.

When the pressure in the reactor pressure vessel 7 has decreased to a predetermined level due to the operation 49 of ADS, LPFL of the low-pressure emergency core cooling systems are then operated (LPFL 20 operate). Consequently, the water level in the nuclear reactor increases. The operable low-pressure emergency core cooling systems in this case are two systems, i.e. LPFL 42A, 42B in the sections I and III.

The water level in the nuclear reactor becomes the lowest when these two LPFL's are in operation (two LPFL 51 operate), and is slightly lower than the top of effective heat generating portion of the core 9. However, the integration of the nuclear reactor is not adversely affected at all.

Figure 6:
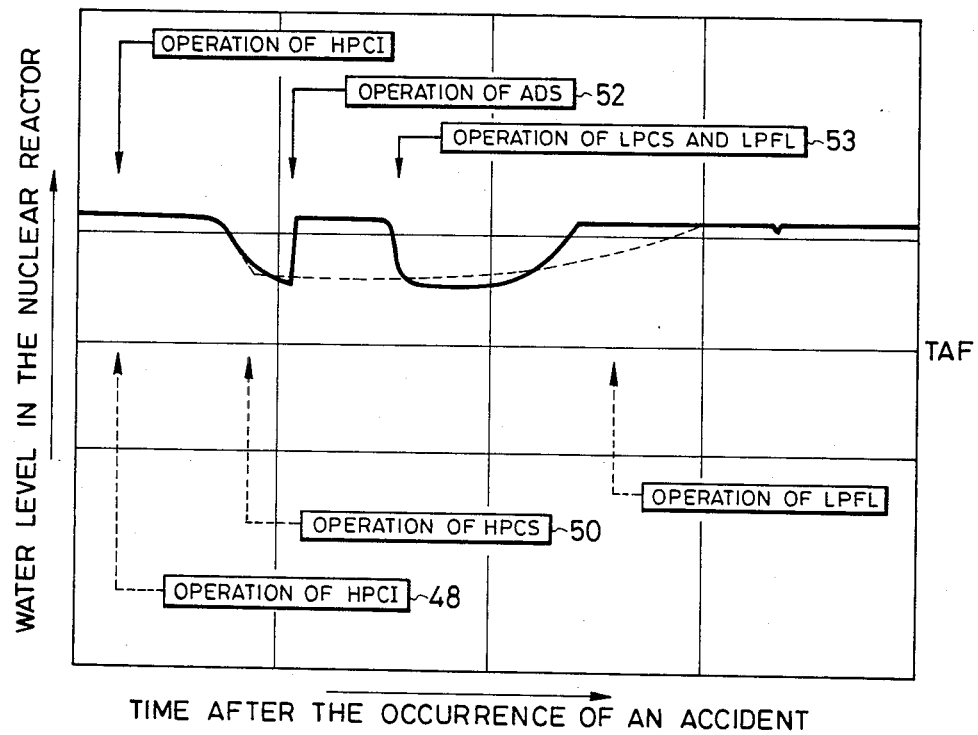
FIG. 6 is a characteristic diagram showing transients of the water level in the nuclear reactor at the time of occurrence of the breakage of a pipe for a core flooder.

The broken line in FIG. 6 shows the transient of the nuclear reactor water level in the conventional core cooling systems in the case where a pipe for a LPFL, a low-pressure emergency core cooling system is broken.

When a pipe for a LPFL system is broken, the nuclear reactor is automatically scrammed and isolated, and the cooling water in the reactor pressure vessel 7 blow down from a brak pipe. The elevation of a water injection ports, which are in the interior of the reactor pressure vessel 7, of HPCS's is lower than that of the injection ports therein of LPFL's. Therefore, the time during which the water level in the nuclear reactor becomes to lower than the elevation of the water injection port of the broken LPFL pipe decreases, so that this water injection port of the LPFL is exposed to the vapor earlier. Accordingly, the start of depressurization in the reactor pressure vessel 7 is occurred earlier. This causes an increase in the water level in the nuclear reactor due to the flushing by depressurization of the cooling water to start earlier, and the decrease of the water level in the nuclear reactor to start later. Since the water level in the nuclear reactor starts decreasing later, the starting time of the operations (HPCS 50 operates) of HPCS is also delayed. However, since the pressure in the reactor pressure vessel 7 decreases early, the flow rate of the cooling water injected into the reactor pressure vessel 7 after the starting of the operations of HPCS becomes increase. After all, the water level in the nuclear reactor is kept higher than that therein at the case of occurrence of the breakage of a pipe for a HPCS shown in FIG. 5.

As is understood from FIGS. 5 and 6, the water level in the nuclear reactor at the case of occurrence of the HPCS pipe break in the conventional emergency core cooling structure is more decrease than the case of LPFL pipe break, and there is the possibility that the case of HPCS pipe break becomes the severest accident on the nuclear reactor.

The conventional emergency core cooling apparatus has the highest safety-retaining performance amount the currently-available nuclear power plants, and is capable of maintaining the integration of a nuclear power plant. The characteristics of the conventional emergency core cooling apparatus reside in that a high-pressure emergency core cooling system is provided in each section thereof with two systems of HPCS provided, which furnish the high-pressure emergency core cooling systems with the core-spraying functions so that the cooling of the core can be done securely, while the core is uncovered, in all operational regions from an operational region in which the pressure in the reactor pressure vessel 7 is high to an operational region in which the pressure in the reactor pressure vessel 7 is low.

As mentioned above, the conventional emergency core cooling apparatus secures the safety of a nuclear power plant sufficiently. However, it is most desirable that such a nuclear power plant be developed that is capable of preventing the water level in the nuclear reactor from decreasing below the top of effective heat generating portion of the core no matter what kind of accident occurs in the plant. The present inventors made a study of an emergency core cooling apparatus, which is capable of solving the above-mentioned newly-discovered problems, from various aspects to complete an emergency cooling apparatus capable of securing perfect safety, and having excellent core cooling capability and the first characteristics mentioned above.

The present inventors discovered new problems, which will be described as follows, of a conventional apparatus of this kind. In the conventional emergency core cooling apparatus, the heat exchangers 43 provided in the low-pressure emergency core cooling systems, i.e. LPFL's 42A-42C function as residual heat removing systems. In order to cool the core when the nuclear reactor is stopped under normal conditions, the cooling water in the portion of the interior of the pressure vessel which is on the outer side of the core shroud 8 is supplied to the heat exchangers 43 to cool the same, and the cooling water is thereafter returned to the same portion of the interior of the pressure vessel. However, the ports, from which the cooling water supplied to the heat exchangers 43, is taken out, of the pressure vessel, and the ports, from which the cooling water discharged from the heat exchangers is returned to the pressure vessel, thereof are provided close to each other. In order to improve the cooling water-cooling efficiency, large-capacity heat exchangers 43 are used. The reduction of the capacity of this heat exchanger serves to miniaturize the emergency core cooling apparatus. The present inventors' discussion about an apparatus of this kind from this point of view led the invention of the emergency core cooling apparatus having the second characteristics mentioned above.

An embodiment of the present invention, which was made on the basis of the results of this discussion, will now be described.

Figure 2:
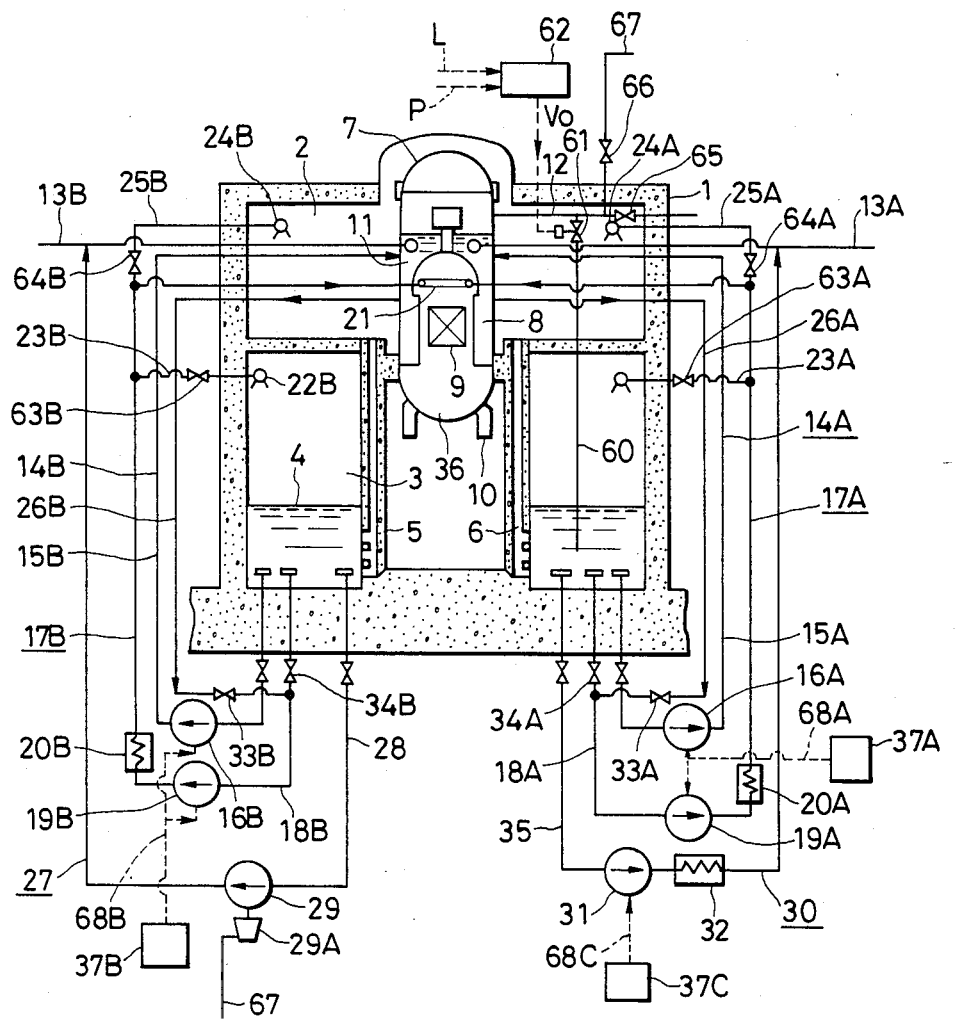
FIG. 2 is a system diagram of a preferred embodiment of the emergency core cooling apparatus according to the present invention.

A preferred embodiment of the emergency core cooling apparatus according to the present invention applied to a boiling water reactor will now be described with reference to FIGS. 2, 3 and 4.

First, the construction of the inner side of a reactor containment vessel will be described. A reactor containment vessel 1 has a drywell 2 and a pressure suppression chamber 3 filled with cooling water 4. A reactor pressure vessel 7 is provided in the drywell 2 and set on a pedestal 5. The pressure suppression chamber 3 surrounds the circumference of the pedestal 5. A vent passage 6 is provided in the pedestal 5. The upper end of the vent passage 6 is opened in the drywell 2, and the lower end portion of the vent passage 6 in the cooling water 4 in the pressure suppression chamber 3.

A core 9 is set within a core shroud 8 provided in a reactor pressure vessel 7. An internal pump 10 for supplying cooling water to the core 9 is provided on the lower portion of the reactor pressure vessel 1.

When the internal pump 10 is driven, the cooling water in an upper plenum 11, which is formed in the portion of the interior of the reactor pressure vessel 7 which is on the outer side of the core shroud 8, is supplied to the core 9. This cooling water is heated by the core 9 to turn into steam. The steam is sent from the reactor pressure vessel 7 to a turbine (not shown) through a main steam pipe 12. The steam discharged from the turbine is condensed in a condenser (not shown) to turn into water, and this water is supplied to the upper plenum 11 in the reactor pressure vessel 7 through feed water pipes 13A, 13B. The main steam pipe 12 is provided in the portion thereof which is within the drywell 2 with a main steam isolating valve 65.

The boiling water reactor constructed as mentioned above has as emergency core cooling systems two systems of high-pressure core flooding apparatus (which will hereinafter be referred to as HPFL's) 14A, 14B, two systems of low-pressure core spray apparatus (which will hereinafter be referred to as LPCS's) 17A, 17B, one system of HPCI 27, and one system of LPFL 30. HPFL's 14A, 14B and HPCI 27 are high-pressure emergency core cooling systems, and LPCS's 17A, 17B and LPFL 30 low-pressure emergency core cooling systems.

HPFL 14A has a HPFL pipe 15A by which the pressure suppression chamber 3 and the reactor pressure vessel 7 are connected, and a HPFL pump 16A provided in the HPFL pipe 15A. HPFL 14B also has a HPFL pipe 15A and a HPFL pump 16A as HPFL 14A. The HPFL pipes 15A, 15B are opened in the upper plenum 11.

LPCS 17A consists of a LPCS pipe 18A by which the pressure suppression unit 3 and a core spray header 21 provided in the reactor pressure vessel 7 are connected, a LPCS pump 19A provided in the LPCS pipe 18A, and a heat exchanger 20A provided in the portion of the LPCS pipe 18A which is on the downstream side of the LPCS pump 19A. The core spray header 21 is provided at the portion of the interior of the core shroud 8 which is above the core 9. The LPCS pipe 18A extends through the wall of the reactor pressure vessel 7 and core shroud 8 to be joined to the core spray header 21. LPCS 17B consists of a LPCS pipe 18B, a LPCS pump 19B and a heat exchanger 20B as LPCS 17A. The heat exchangers 20A, 20B are coolers. The suction pipes 26A, 26B are connected via valves 33A, 33B to the portions of the LPCS pipes 18A, 18B which are on the upstream side of the LPCS pumps 19A, 19B.

The spray headers 22A, 22B are provided at the upper portions of the interior of the pressure suppression chamber 3. The spray headers 22A, 22B are connected via pipes 23A, 23B to the portions of the LPCS pipes 18A, 18B which are on the downstream side of the heat exchangers 20A, 20B. The valves 63A, 63B are provided in the pipes 23A, 23B, respectively. The spray headers 24A, 24B provided at the upper portion of the interior of the drywell 2 are connected to the LPCS pipes 18A, 18B via pipes 25A, 25B. The valves 64A, 64B are provided in the pipes 25A, 25B, respectively.

HPCI 27 has a HPCI pipe 28 by which the pressure suppression chamber 3 and feed water pipe 13B are connected to each other, and a HPCI pump 29 provided in the HPCI pipe 28. This HPCI pump is connected to a turbine which is driven by the steam introduced from the reactor pressure vessel 7. LPFL 30 has a LPFL pipe 35 by which the pressure suppression chamber 3 and feed water pipe 13A are connected to each other, a LPFL pump 31 provided in the LPFL pipe 35, and a heat exchanger 32 provided in the portion of the LPFL pipe 35 which is on the downstream side of the LPFL pump 31. The heat exchanger 32 is a cooler.

The positions of the cooling water discharge ports, which are in the upper plenum 11, of the HPFL pipes 15A, 15B are set higher than that of the core spray header 21, i.e. the positions of the cooling water discharge ports, which are in the reactor pressure vessel 7 of LPCS's 17A, 17B. The position of a feed water header, i.e. the position of a cooling water discharge port, which is in the reactor pressure vessel 7, of HPCI 27 is also set higher than that of the core spray header 21.

The emergency core cooling apparatus has three diesel-engine generators 37A, 37B, 37C as emergency power sources so that, even when the driving power source in normally use fails, the structure can continue to display its performance normally. The pumps 16A, 19A in HPFL 14A and LPCS 17A are connected to the diesel generator 37A by an electric cable 68A so that these pumps 16A, 19A are driven by the diesel generator 37A in an emergency. The diesel generator 37B is connected to the motors (not shown) for the pumps 16B, 19B in the HPFL 14B and LPCS 17B by an electric cable 68B, and constitutes an emergency power source for driving these pumps. The pump 31 in LPFL 30 is connected to an electric cable 68C and driven by the remaining diesel generator 37C in an emergency. The pumps 16A, 16B, 19A, 19B, 31 are motor-driven pumps. The pump 29 is a turbine-driven pump. When a valve 66 is opened, steam is supplied to a turbine 29A, which is connected to the pump 29, via a pipe 67. The pipe 67 is connected to the portion of the main steam pipe 12 which is on the upstream side of the main steam isolation valve 65. While the pump 29 is driven, the main steam isolation valve 65.

Figure 3:
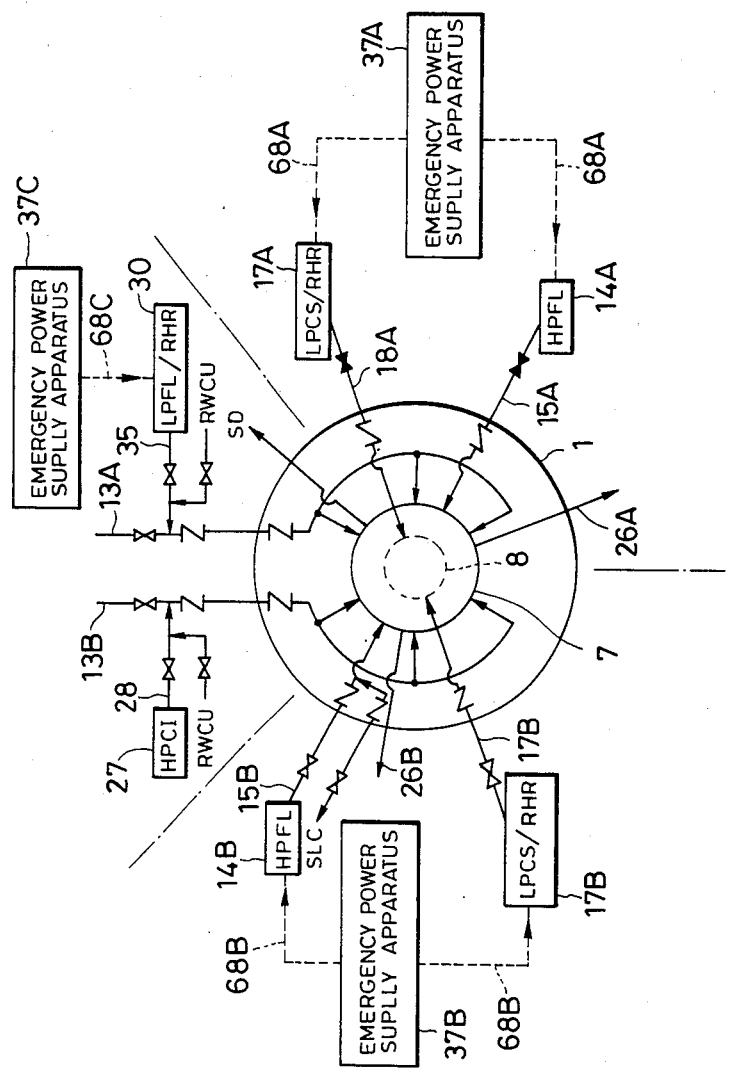
FIG. 3 is an arrangement diagram in plan of the emergency core cooling apparatus shown in FIG. 2.
Figure 4:
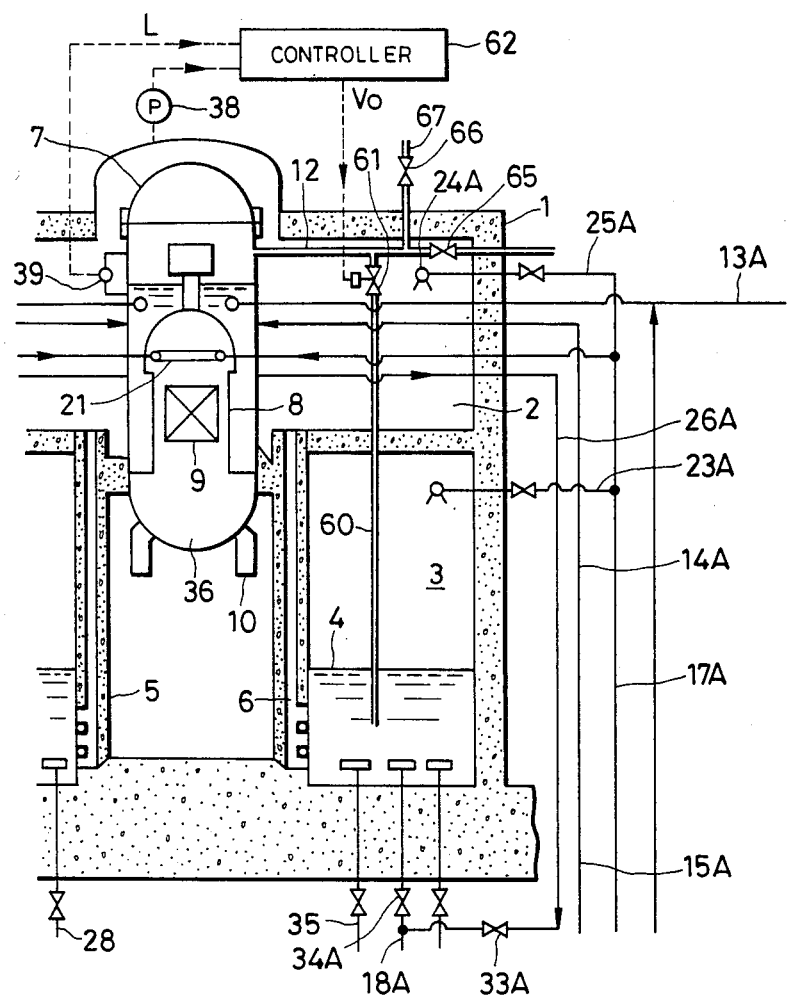
FIG. 4 is an enlarged view of a part of the embodiment of FIG. 2.

The emergency core cooling apparatus is divided into three sections relatively to the three emergency diesel-engine generators as shown in FIG. 3. A section I includes HPFL 14A and LPCS 17A, a section II HPFL 14B and LPCS 17B, and a section III HPCI 27 and LPFL 30. Each section includes one system of high-pressure emergency core cooling apparatus and one system of low-pressure emergency core cooling apparatus.

The discharge pipe and ADS will now be described in detail with reference to FIG. 4. The discharge pipe 60 is connected to the main steam pipe 12 via a relief valve 61. The other end of the discharge pipe 60 is opened in the cooling water 4 in the pressure suppression chamber 3. A pressure gauge 38 for measuring the pressure P (in the reactor containment vessel 1) in the drywell 2 is provided on the reactor containment vessel 1. A water level gauge 39 for measuring the water level L in the reactor in the reactor pressure vessel 7 is provided therein. A controller 62 is adapted to receive output signals P and L from the pressure gauge 38 and water level gauge 39, and open a relief valve 61 when the pressure P and water level L have exceeded predetermined levels. The ADS consists of the pressure gauge 38, water level gauge 39, controller 62 and relief valve 61. The relief valve 61 is provided with a spring. It is adapted to be opened in accordance with an output signal from the controller 62, and also like a safety valve when the pressure in the reactor pressure vessel has exceeded a predetermined level.

When the breakage of a pipe occurs, HPFL's 14A, 14B are operated at a point in time, at which the pressure in the reactor pressure vessel 7 is high, immediately after the occurrence of the accident, with the HPFL pumps 16A, 16B driven to thereby inject the cooling water 4 from the pressure suppression chamber 3 into the upper plenum 11. During this time, HPCI 27 and LPFL 30 are also operated with the HPCI pump 29 and LPFL pump 31 driven to thereby inject the cooling water from the pressure suppression chamber 3 into the upper plenum 11 via the feed water pipes 13B, 13A. The cooling water 4 injected by these systems into the upper plenum 11 flows down in a clearance between the wall of the pressure vessel 7 and core shroud 8 to reach a lower plenum 36 below the core 9. The cooling water is collected in the lower plenum 36, and the core 9 is then flooded.

In an emergency in which the breakage occurs in a pipe connected to the reactor pressure vessel 7, the LPCS's 17A, 17B are operated with the LPCS pumps 19A, 19B driven after the pressure in the reactor pressure vessel 7 has decreased to a predetermined level after the starting of the HPFL's 14A, 14B, to supply the cooling water in the pressure suppression chamber 3 to the core spray header 21 via the LPCS pipes 18A, 18B. The cooling water thus introduced into the spray header 21 through the LPCS pipes 18A, 18B is discharged in the core shroud 8 from a spray nozzle (not shown) provided in the header 21 toward the core 9. During this time, the valves 34A, 34B are open, while the valves 33A, 33B are closed. The cooling water 4 is cooled by the heat exchangers 20A, 20B while it flows in the LPCS pipes 18A, 18B. The cooling water cooled by the heat exchangers 20A, 20B is sprayed in such an emergency as mentioned above from the core spray header 21 into the core 9. Consequently, the cooling of the core 9 is promoted after the pressure decrease in the reactor pressure vessel 7. The cooling water discharged from the heat exchangers 20A, 20B can be sprayed as necessary from the spray headers 22A, 22B into the suppression chamber 3 and also from the spray headers 24A, 24B into the drywell 2 by opening the valves 63A, 63B, 64A, 64B.

In an emergency in which a pipe is broken to cause the high-pressure and low-pressure emergency core cooling systems to be operated, the nuclear reactor is scrammed.

When the breakage of a pipe occurs, HPFL and HPCI are operated from the time at which the pressure in the reactor pressure vessel is high, and LPCS and LPFL at the time at which the pressure in the reactor pressure vessel 7 has decreased to a level which is lower than a certain low level.

LPCS's 17A, 17B function not only in such an emergency as mentioned above but also when the nuclear reactor is stopped (while the nuclear reactor is stopped) under normal conditions for carrying out the maintenance and inspection of the nuclear power plant and the replacement of the fuel.

When the nuclear reactor is stopped under normal conditions, the valves 33A, 33B are opened, while the valves 34A, 34B and the valves 63A, 63B, 64A, 64B provided in the pipes 23A, 23B, 25A, 25B are closed. The LPCS pumps 19A, 19B are driven with these valves in the mentioned state. The high-temperature cooling water in the upper plenum 11 is supplied to the heat exchanger 20A via the suction pipe 26A and LPCS pipe 18A, and into the heat exchanger 20B via the suction pipe 26B and LPCS pipe 18B, to be cooled by these heat exchangers. The cooling water cooled by the heat exchangers 20A, 20B is introduced into the core spray header 21 by the LPCS pipes 18A, 18B and discharged therefrom into the portion of the interior of the shroud 8 which is above the core 9. The low-temperature cooling water thus discharged flows down as it cools the core 9. While the cooling water flows down through the core 9, the temperature thereof increases. The cooling water having such an increased temperature flows up through an annular clearance (a part of the upper plenum 11) formed between the wall of the pressure vessel 7 and core shroud, via the lower plenum 36, and enter the suction pipes 26A, 26B. During this time, the valves 63A, 63B, 64A, 64B are closed.

As described above, while the nuclear reactor is stopped under normal conditions, the cooling water in the reactor pressure vessel 7 is circulated in a closed loop which connects together the upper plenum 11, suction pipe 26A, LPCS pump 19A, heat exchanger 20A, core spray header 21, core 9, lower plenum 36 and upper plenum 11 (and upper plenum 11, suction pipe 26B, LPCS pump 19B, heat exchanger 20B, core spray header 21, core 9, lower plenum 26 and upper plenum 11). Therefore, the cooling water cooled by the heat exchangers 20A, 20B is necessarily introduced into the core 9, and the cooling water, which has passed through the core 9, into the heat exchangers 20A, 20B. Accordingly, the core 9 can be cooled efficiently for a long period of time after the nuclear reactor is stopped under normal conditions. Moreover, since the high-temperature cooling water discharged from the core 9 is introduced into the heat exchangers 20A, 20B, the cooling efficiency of the heat exchangers 20A, 20B can be improved, and each of the heat exchangers can be made compact.

The suction pipes 26A, 26B may be connected to the bottom portion of the reactor pressure vessel 7 so as to be directly communicated with not the upper plenum 11 but the lower plenum 36.

When the HPFL pipe 15A in the section I is broken with the diesel-engine generator in the section II failing, HPCI 27 is left as an operable high-pressure core cooling system.

The variations in the water level in the nuclear reactor after the occurrence of the breakage of the HPFL pipe 15A under such conditions are shown by a solid line in FIG. 6.

FIG. 6 shows comparatively by a broken line the variations in the water level in a nuclear reactor, which are recorded after the breakage of a pipe in the LPFL system in the above-mentioned conventional emergency core cooling apparatus of this kind occurred.

The water level (solid line) in the nuclear reactor, to which this embodiment is applied, in an emergency in which the breakage of a pipe in LPFL occurs is restored to a normal level earlier under the above-mentioned conditions as compared with the water level (broken line) in a nuclear reactor to which the conventional emergency core cooling apparatus is applied, for the following reasons. The number of the high-pressure emergency core cooling system to be operated in the present invention is less than that in the conventional emergency core cooling apparatus (Conventional apparatus: 2 systems, Embodiment of the present invention: 1 system). Therefore, in the present invention, the ADS, which is adapted to be operated at a water level in the nuclear reactor, which is lower than the water level at which the high-pressure emergency core cooling system is operated, is operated (ADS 52 operates), and two (one system in the conventional structure) low-pressure emergency core cooling systems (LPCS 17A and LPFL 30) are operated early (LPCS and LPFL 53 operate).

The variations in the water level in the nuclear reactor, which are recorded after the breakage of the LPCS pipe 18A in this embodiment occurred, are shown by a solid line in FIG. 5.

If in this case the LPCS pipe 18A in the section I is broken with the diesel-engine generator in the section II failing, HPFL 14A and HPCI 27 are left as operable high-pressure emergency core cooling systems, and LPFL 30 alone as an operable low-pressure emergency core cooling system.

FIG. 5 shows comparatively by a broken line the variations in the water level in a nuclear reactor, which are recorded after the breakage of the pipe 13 in the HPCS system in the above-mentioned conventional emergency core cooling apparatus of this kind occurred.

A decrease in the water level (solid line) in the nuclear reactor in the embodiment of the present invention is suppressed under the above-mentioned conditions as compared with that (broken line), which is recorded after the breakage of the pipe in HPCS occurs in the nuclear reactor to which the conventional emergency core cooling structure is applied, since two high-pressure emergency core cooling systems in the present invention are operated (HPCI 48 and HPFL 54 operate) immediately after the occurrence of the breakage of a pipe. Consequently, the lowest water level in the nuclear reactor in this embodiment becomes not lower than the top of effective heat generating portion (TAF) of the core.

According to this embodiment, the following effects can be obtained.

(1) HPFL's are used as high-pressure emergency core cooling systems, and LPCS's as low-pressure emergency core cooling systems. Accordingly, the position of the cooling water injection ports, which are in the reactor pressure vessel, of the high-pressure emergency core cooling systems can be set higher than that of the cooling water injection ports, which are in the pressure vessel of LPCS's. This enables the following advantages to be obtained.

(a) Even when the breakage of a pipe in a high-pressure emergency core cooling system occurs, which causes the severest conditions for restoring a normal water level to create in the conventional nuclear plant, the quantity of the cooling water discharged from the reactor pressure vessel can be minimized since the position of the cooling water injection ports of HPFL's is high. Moreover, since the water injection rate increases due to the early depressurization in the pressure vessel, the core cooling capability of the core cooling apparatus at the time of occurrence of breakage of a pipe improves greatly.

(b) When a pipe in a low-pressure core cooling apparatus (LPCS) is broken, the position of the cooling water injection ports of LPCS's becomes low but, in this case, two high-pressure emergency core cooling systems start being operated. Accordingly, a satisfactory cooling water injection rate can be secured from a point in time which is immediately after the breakage of the pipe with the pressure in the reactor pressure vessel in a high level. Accordingly, the core cooling capability of the core cooling apparatus at the time of occurrence of breakage of a pipe improves greatly.

(2) When the high-pressure emergency core cooling systems are used as high-pressure injection systems at the time occurrence of a nuclear reactor isolation phenomenon, not HPCS's but HPFL's are used. Therefore, the thermal fatigue of the core spray sparger can be avoided, and the safety of the nuclear reactor can be improved.

(3) It is effective to use HPCS's for cooling the core in uncovered state. However, when HPCS's are used to cool the core in covered state, the injection of cooling water is to be done into the upper portion of the core against the flow of the core cooling water, so that the natural circulation cooling capability lowers. However, if HPFL's are used, the cold water is injected into the space on the outer side of the core shroud when the temperature and pressure in the pressure vessel are high. This causes the flow rate of the naturally-circulated cooling water and the sub-cooling degree to increase, and the core-cooling effect to be improved.

According to this embodiment described above, the safety of the nuclear reactor can be greatly improved by merely changing the connection of the pipes in the emergency core cooling apparatus without changing at all the parts and construction of the conventional core, pressure vessel and emergency core cooling apparatus.

(4) As previously mentioned, the core-cooling efficiency during the stoppage of the nuclear reactor under normal conditions can be improved, and the capacity (dimensions) of the heat exchangers (coolers) in the low-pressure emergency core cooling systems can be reduced.

(5) Each of the three sections of this embodiment is provided with one emergency diesel-engine generator as mentioned previously, and also one system of high-pressure emergency core cooling apparatus and one system of low-pressure core cooling apparatus. This enables the safety of the nuclear reactor to be improved.

(6) Each of the low-pressure emergency core cooling apparatuses in this embodiment has a cooler. Accordingly, even when the pressure in the reactor pressure vessel is low, in which occasion the low-pressure emergency core cooling apparatus is operated, i.e., even when the temperature in the reactor vessel is low, the core can be cooled efficiently with the low-temperature cooling water supplied from the cooler in the same cooling apparatus. The temperature in the pressure vessel is low since the pressure therein is low. Therefore, the thermal impact which the core spray header 21 receives, which is provided above the core, can be reduced greatly even when the low-temperature cooling water is supplied from the above-mentioned cooler to this spray header as compared with the thermal impact similarly occurring in the conventional apparatus of this kind in which the cooling water is supplied to the core spray header 21, which is in a high-temperature, high-pressure atmosphere, by the HPCS's 40A, 40B.

According to the present invention, the effective heat generating portion of the core is not exposed no matter whatever pipe in the emergency core cooling apparatus may be broken. Some other characteristics of the present invention reside in the coolers, which can be made compact, in the low-pressure emergency core cooling systems, and the improved core-cooling functions, which are fulfilled during the stoppage of the nuclear reactor under normal conditions, of the emergency core cooling apparatus.

What is claimed is:

1. An emergency core cooling apparatus having a plurality of high-pressure emergency core cooling systems adapted to supply a coolant to the interior of a reactor vessel, and a plurality of low-pressure emergency core cooling systems adapted to supply a coolant to the interior of a core-surrounding cylindrical shroud provided in said reactor vessel, characterized in that the elevation of the coolant discharge ports, which are in said reactor vessel, of all of said high-pressure emergency core cooling systems is higher than that of those, which are in said shroud, of all of said low-pressure emergency cooling systems.

2. An emergency core cooling apparatus according to claim 1, wherein said coolant discharge ports of said high-pressure emergency core cooling systems are opened in the region which is between said reactor vessel and said shroud, said coolant discharge ports of said low-pressure emergency core cooling systems being sprayer means provided in the portion which is higher than said core, of the interior of said shroud.

3. An emergency core cooling apparatus according to claim 1, wherein said high-pressure emergency core cooling systems are high-pressure core flooding apparatuses and a high-pressure coolant injection apparatus, said low-pressure emergency core cooling systems are low-pressure core spray apparatuses.

4. An emergency core cooling apparatus having a plurality of high-pressure emergency cooling systems adapted to supply a coolant to the interior of a reactor vessel, and a plurality of low-pressure emergency core cooling systems adapted to supply a coolant to the interior of a core-surrounding cylindrical shroud provided in said reactor vessel, each of said low-pressure emergency core cooling systems including a cooling means, characterized in that the elevation of the coolant discharge ports, which are in said reactor vessel, of all of said high-pressure emergency core cooling systems is higher than that of those, which are in said shroud, of all of said low-pressure emergency core cooling systems.

5. An emergency core cooling apparatus to claim 4, wherein said coolant discharge ports of said high-pressure emergency core cooling system are opened in the region which is between said reactor vessel and said shroud, said coolant discharge ports of said low-pressure emergency core cooling systems being sprayer means provided in the portion, which is higher than said core of the interior of said shroud.

6. An emergency core cooling apparatus according to claim 4, wherein said high-pressure emergency core cooling systems are high-pressure core flooding apparatuses and a high-pressure coolant injection apparatus, said low-pressure emergency core cooling systems are low-pressure core spray apparatuses.

7. An emergency core cooling apparatus having a plurality of high-pressure emergency core cooling systems adapted to supply a coolant to the interior of a reactor vessel, and a plurality of low-pressure emergency core cooling systems adapted to supply a coolant to the interior of a core-surrounding cylindrical shroud provided in said reactor vessel, characterized in that the elevation of the coolant discharge ports, which are in said reactor vessel, of all of said high-pressure emergency core cooling systems, is higher than that of those, which are in said shroud, of all of said low-pressure emergency core cooling systems, said low-pressure emergency core cooling systems providing cooling means, sprayer means which constitute said coolant discharge ports of said low-pressure emergency core cooling systems, and which are adapted to discharge the coolant sent out from said cooling means, being provided in the portion, which is above said core, of the interior of said core-surrounding shroud, pipes for supplying the coolant in said reactor vessel to said cooling means being connected to either the region, which is lower than said core, of the interior of said reactor vessel or the region thereof which is between the side wall of said reactor vessel and said shroud, control means adapted to be closed when the nuclear reactor is stopped in an emergency based on the breakage of a pipe, and opened when the nuclear reactor is stopped under normal conditions being provided is said coolant supply pipes.

8. An emergency core cooling apparatus according to claim 7, wherein said coolant discharge ports of said high-pressure emergency core cooling system are opened in the region which is between said reactor vessel and said shroud, said coolant discharge ports of said low-pressure emergency core cooling systems being sprayer means provided in the portion, which is higher than said core, of the interior of said shroud.

9. An emergency core cooling apparatus according to claim 7, wherein said high-pressure emergency core cooling systems are high-pressure core flooding apparatuses and a high-pressure coolant injection apparatus, said low-pressure emergency core cooling systems are low-pressure core spray apparatuses.

10. An emergency core cooling apparatus comprising two low-pressure core spray apparatuses adapted to supply a coolant to spray means provided in a core-surrounding cylindrical shroud provided in a reactor vessel, three high-pressure emergency core cooling apparatuses which are adapted to supply a coolant into said reactor vessel, and which have coolant discharge ports provided in positions higher than said spray means, and a low-pressure core flooding apparatus having a coolant discharge port provided in a position higher than said spray means.

11. An emergency core cooling apparatus according to claim 10, wherein the coolant discharge ports of said high-pressure emergency core cooling apparatuses and said low-pressure core flooding apparatus are opened in the region which is between said reactor vessel and said shroud.

12. An emergency core cooling apparatus according to claim 11, wherein said low-pressure core flooding apparatus is opened in said reactor vessel via a feed water pipe.

13. An emergency core cooling apparatus according to claim 10, wherein said low-pressure core spray apparatuses and said low-pressure core flooding apparatus include coolers.

14. An emergency core cooling apparatus according to claim 10, wherein said high-pressure emergency core cooling apparatuses include two high-pressure core flooding apparatuses, and one high-pressure coolant injection apparatus.

15. An emergency core cooling apparatus according to claim 14, wherein said high-pressure core flooding apparatuses have motor-driven pumps, said high-pressure coolant injection apparatus having a turbine-driven pump.

16. An emergency core cooling apparatus having two low-pressure core spray apparatuses adapted to supply a coolant to spray means provided in a core-surrounding cylindrical shroud provided in a reactor vessel, two high-pressure core flooding apparatuses and one high-pressure coolant injection apparatus which are adapted to supply a coolant into said reactor vessel, and which have coolant discharge ports provided in positions higher than said spray means, a low-pressure core flooding apparatus having a coolant discharge port provided in a position higher than said spray means, and three independent emergency power sources, one of said low-pressure core spray apparatuses and one of said high-pressure core flooding apparatuses being connected to a first emergency power source by a first cable, the other low-pressure core psray apparatus and the other high-pressure core flooding apparatus being connected to a second emergency power source by a second cable, said low-pressure core flooding apparatus being connected to a third emergency power source by a third cable.

17. An emergency core cooling apparatus according to claim 16, wherein said emergency power sources consist of diesel-engine generators.

18. An emergency core cooling apparatus according to claim 16, wherein the coolant discharge ports of said high-pressure core flooding apparatuses, said high-pressure coolant injection apparatus and said low-pressure core flooding apparatus are opened in the region which is between said reactor vessel and said shroud.

19. An emergency core cooling apparatus according to claim 16, wherein said low-pressure core flooding apparatus is opened in said reactor vessel via said high-pressure coolant injection apparatus and said feed water pipe.

20. An emergency core cooling apparatus according to claim 16, wherein said low-pressure core spray apparatuses and said low-pressure core flooding apparatus include coolers.

* * * * *